Figure 3:
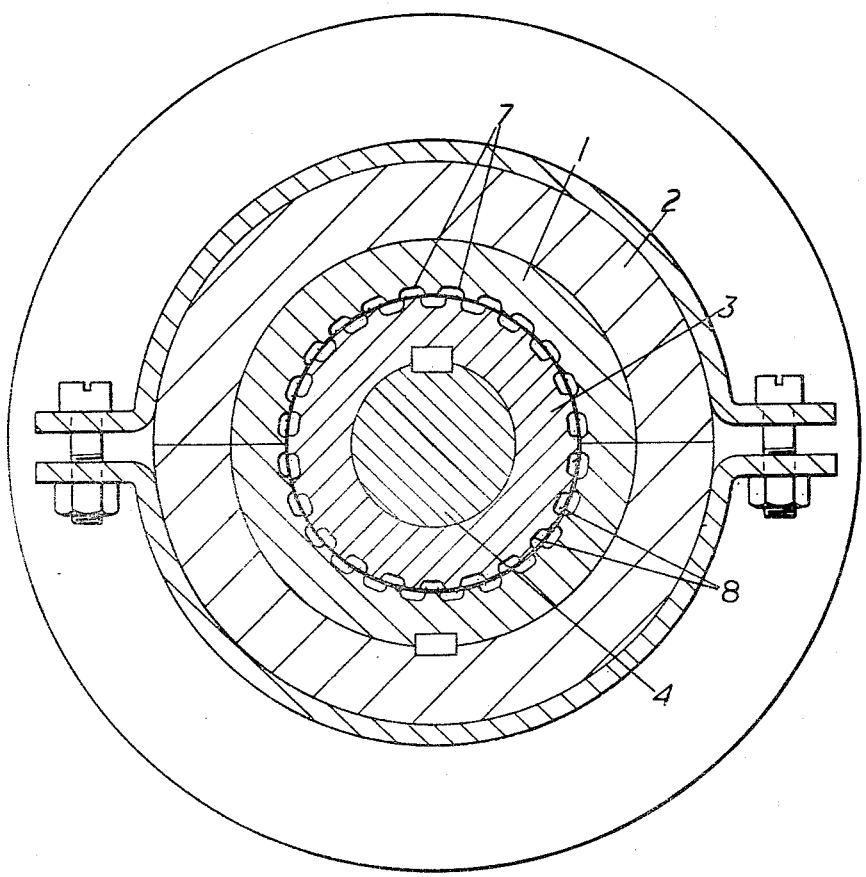

March 23, 1965 K. G. GERBER 3,174,185
EXTRUSION OF MOLTEN THERMOPLASTIC MATERIAL
Filed April 10, 1962 2 Sheets-Sheet 1
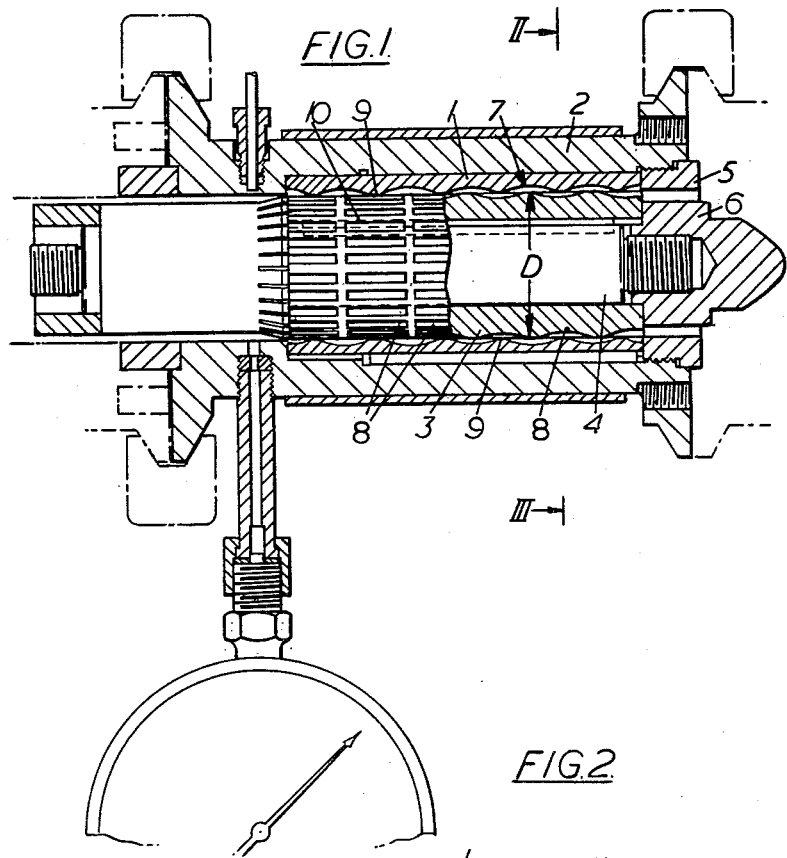
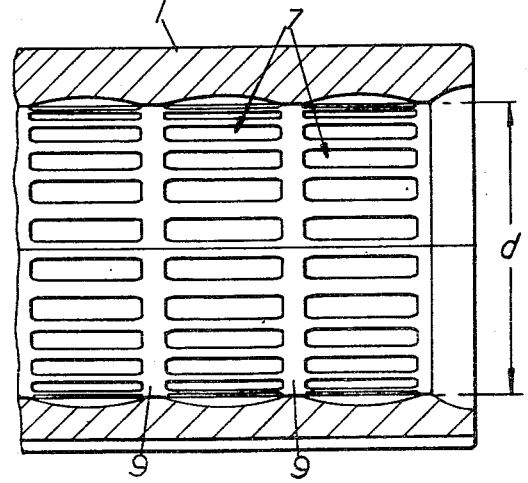
Inventor
KENNETH G. GERBER
By McVie and Finley
Attorneys March 23, 1965 K. G. GERBER 3,174,185
EXTRUSION OF MOLTEN THERMOPLASTIC MATERIAL
Filed April 10, 1962 2 Sheets-Sheet 2

Inventor
KENNETH G. GERBER
By Muirie and Finley
Attorneys

United States Patent Office 3,174,185
Patented Mar. 23, 1965

3,174,185
EXTRUSION OF MOLTEN THERMOPLASTIC MATERIAL
Kenneth George Gerber, London, England, assignor to The Metal Box Company Limited, London, England, a British company
Filed Apr. 10, 1962, Ser. No. 186,543
Claims priority, application Great Britain, May 1, 1961, 15,681/61
5 Claims. (Cl. 18—12)

This invention relates to the extrusion of molten synthetic thermoplastic material, such as polyethylene, polystyrene, or polypropylene.

In apparatus for extruding molten synthetic plastic material as a thin sheet or film, or as a tube, the material is often bed to an extrusion die in the form of a thin annular stream through a mixing head which comprises a stator and a rotor one of which is provided with peripheral grooves and the other with peripheral ribs or projections which extend into the grooves to form therewith a tortuous passage through which the molten material passes. The grooves and ribs are usually of rectangular section and present to the flow of material a succession of relatively sharp edges which tend to shear the material in an undesirable manner. Further, with some kinds of apparatus it is possible to service the rotor only after one half of the stator has been dismantled because due to the projection of the ribs into the grooves it is not possible to withdraw the rotor axially from the stator.

It is an object of the present invention to provide a mixing head which reduces shearing during the passage of molten material through the head and which permits removal of the rotor by axial movement thereof without the necessity of partially dismantling the stator.

Further, the known forms of mixing head referred to are difficult to set up because of the differential expansion between the screw and the barrel and it is a further object of the invention to obtain an improved mixing with a reduction in the shear of the thermoplastic material thus minimizing a rise in temperature due to the shearing action.

According to the invention there is provided a mixing head for mixing or homogenizing molten synthetic thermoplastic material during movement thereof towards an extrusion die, comprising a hollow cylindrical stator member and a cylindrical rotor member rotatable therein about the longitudinal axis thereof, the rotor member having a maximum external diameter slightly less than the minimum internal diameter of the stator member and the facing surfaces of the stator and rotor members being provided with grooves extending longitudinally thereof thereby to form between the stator and rotor members a gently undulating passage in which molten synthetic thermoplastic material may be homogenized and through which the material may flow from one end to the other.

In order that the invention may be clearly understood one embodiment thereof will now be described, by way of example, with reference to the accompanying drawings, in which:

FIGURE 1 is a longitudinal section through a mixing head according to the invention, FIGURE 2 is a longitudinal section of a part of a stator member embodied in the mixing head, and FIGURE 3 is a section through the mixing head on line II–III, FIGURE 1.

Referring to the drawings, the mixing head comprises a hollow substantially cylindrical stator member 1 secured in any suitable manner to a stationary machine element 2, and a substantially cylindrical rotor member 3 keyed to a shaft 4 for rotation therewith about the longitudinal axis thereof in known manner. Molten synthetic thermoplastic material is fed to the mixing head in known manner, not shown, and after passage through the mixing head is passed through a passage formed by an outer annular member 5 secured to the element 2 and an inner member 6 secured to the shaft 4.

The rotor member has a maximum external diameter D, FIGURE 1, which is slightly less than the minimum internal diameter d, FIGURE 2, of the stator member so that, when desired, the rotor member can be withdrawn axially from the stator member without the need for partial dismantling of the stator member. The difference between the diameters D, d is of the order of 0.016 inch.

The stator and rotor members are respectively provided with rows of grooves 7, 8 and the rows extend peripherally around the members. The grooves of each row extend longitudinally of the rotor members and are equispaced around the peripheries of the members, the arrangement being, as shown in FIGURE 1, such that the rows of grooves in the rotor member are so displaced axially thereof in relation to the rows formed in the stator member that the grooves 8 of the rotor member are opposed in part by the grooves 7 of each of two adjoining rows of grooves formed in the stator member.

The grooves 7, 8 are of equal length and are of shallow depth, being of a depth of the order of 0.075 inch, and as can be seen from FIGURE 1 the centre of a row of rotor grooves 8 is aligned with the mid-position 9 between two adjoining rows of grooves 7 formed in the stator member. The grooves 7, 8 are preferably, as shown in the drawings, of arcuate form considered lengthwise of the members 1, 3.

As can be seen from FIGURE 3, the number of grooves in each row of one of the members 1, 3 is different from the number of grooves in each row of the other of the members and in a preferred embodiment of the invention the number of grooves in each row of one of the members exceeds by at least two the number of grooves in each row of the other of the members. As shown in FIGURE 3 each row of grooves 7 contains twenty-four grooves and each row of grooves 8 contains twenty-two grooves.

During operation of the apparatus molten synthetic thermoplastic material is fed as a thin annular stream towards the passage formed by the members 5, 6 through the confining passage formed by the opposed walls of the stator and rotor members and rotation of the rotor member causes the spacing between opposed portions of the walls at any given point of the stator to be constantly varied thus causing movement of the molten material in a direction transverse to the direction of movement of the material through the passage. Rotation of the rotor also causes kneading of the material due to the constantly varying distance between the grooves 7, 8 the distance being greatest when a groove 8 is exactly opposite a groove 7 and least when an exterior peripheral portion 10 of the rotor member is opposite the groove 8. This kneading action gives an improved mixing of the material as compared with that obtainable by mixing heads known prior to the invention because the kneading effect could not be achieved by the use of the known forms of mixing head.

It will be understood that, if desired, the rows of grooves 8 may contain a number of grooves in excess of the number contained in the rows of grooves 7.

It will also be understood that because the maximum external diameter D of the rotor member 3 is less than the minimum internal diameter d of the stator member the rotor member can, when desired, be removed axially from the stator member without the need for partial dismantling of the stator member.

I claim:
1. A mixing head for mixing or homogenizing molten synthetic thermoplastic material during movement thereof towards an extrusion die, comprising a hollow cylindrical stator member and a cylindrical rotor member rotatable therein about the longitudinal axis thereof, said rotor member having a maximum external diameter slightly less than the minimum internal diameter of the stator member, rows of grooves extending peripherally around the interior surface of the stator member and spaced apart axially thereof, the grooves of each row extending longitudinally of the stator and being equi-spaced around the periphery thereof, rows of grooves extending peripherally around the exterior of the rotor member and spaced apart axially thereof, the grooves of each row extending longitudinally of the rotor and being equi-spaced around the periphery thereof, the number of grooves in each row of the stator member being different from the number of grooves in each row of the rotor member, the rows of grooves in the rotor member being displaced axially thereof in relation to the rows formed in the stator member so that the grooves of a row formed in the rotor member are opposed in part by the grooves of each of two adjoining rows of grooves formed in the stator member.

2. A mixing head according to claim 1, wherein the number of grooves in each row of one of said members exceeds by two the number of grooves in each row of the other of the members.

3. A mixing head according to claim 1, wherein the grooves of each row formed in the rotor and stator members are of equal length and the centre of a row of rotor member grooves is aligned with the mid-position between two adjoining rows of grooves formed in the stator member.

4. A mixing head for mixing or homogenizing molten synthetic thermoplastic material during movement thereof towards an extrusion die, comprising a hollow cylindrical stator member and a cylindrical rotor member rotatable therein about the longitudinal axis thereof, said rotor member having a maximum external diameter slightly less than the minimum internal diameter of the stator member, rows of grooves extending peripherally around the interior surface of the stator member and spaced apart axially thereof, the grooves of each row extending longitudinally of the stator and being equi-spaced around the periphery thereof, rows of grooves extending peripherally around the exterior of the rotor member and spaced apart axially thereof, the grooves of each row extending longitudinally of the rotor and being equi-spaced around the periphery thereof, the grooves being of arcuate form considered lengthwise of the members and the number of grooves in each row of the stator member being different from the number of grooves in each row of the rotor member, the rows of grooves in the rotor member being displaced axially thereof in relation to the rows formed in the stator member so that the grooves of a row formed in the rotor member are opposed in part by the grooves of each of two adjoining rows of grooves formed in the stator member.

5. A mixing head according to claim 4, wherein the number of grooves in each row of one of said members exceeds by two the number of grooves in each row of the other of the members.

References Cited in the file of this patent
UNITED STATES PATENTS

| | | |
|---|---|---|
| 2,639,464 | Magerkurth | May 26, 1953 |
| 2,813,302 | Beck | Nov. 19, 1957 |
| 2,970,817 | Gurley | Feb. 7, 1961 |
| 3,008,187 | Slade | Nov. 14, 1961 |

FOREIGN PATENTS

| | | |
|---|---|---|
| 841,743 | Great Britain | July 20, 1960 |
| 843,849 | Great Britain | Aug. 10, 1960 |